UNITED STATES PATENT OFFICE.

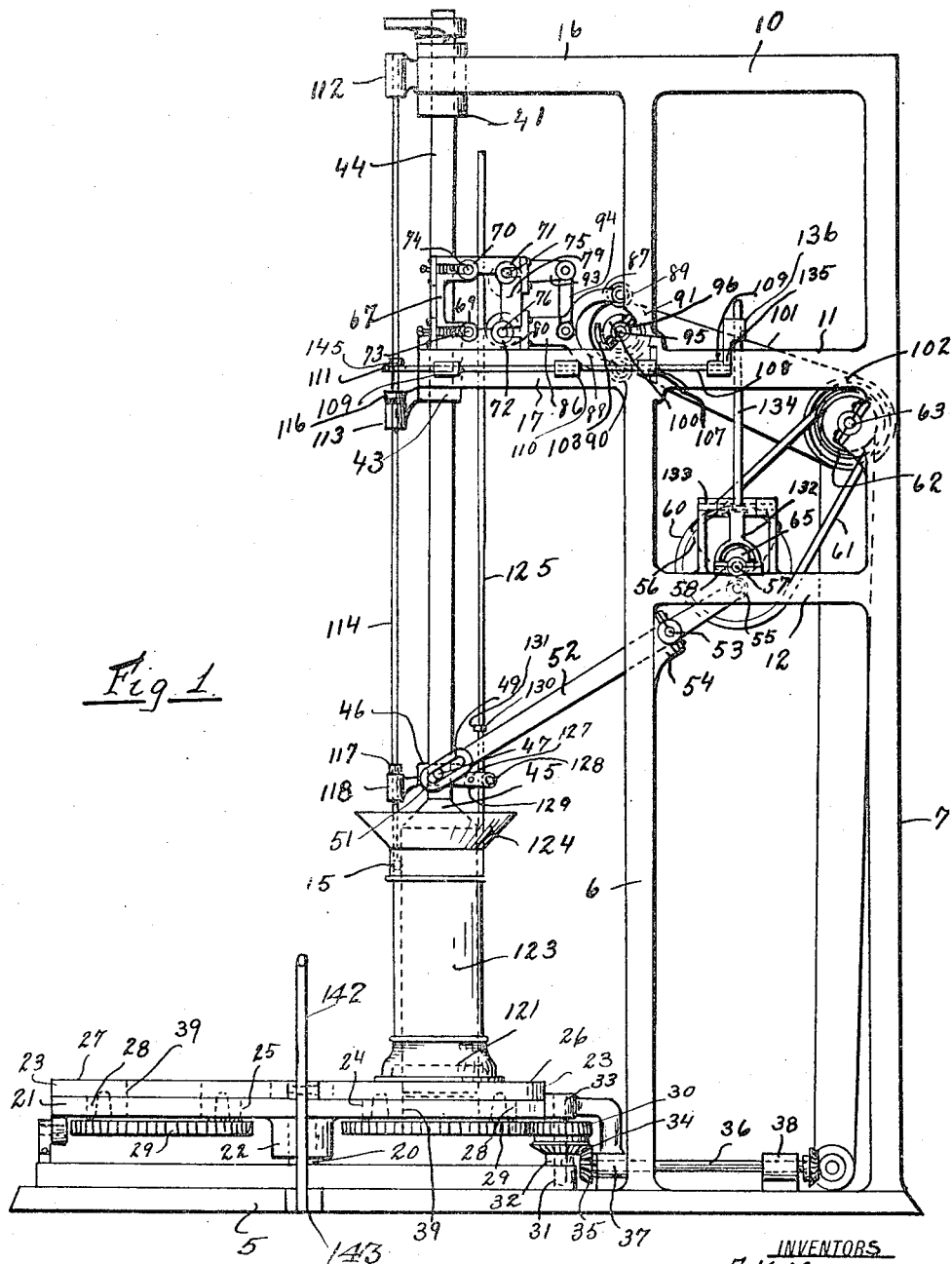

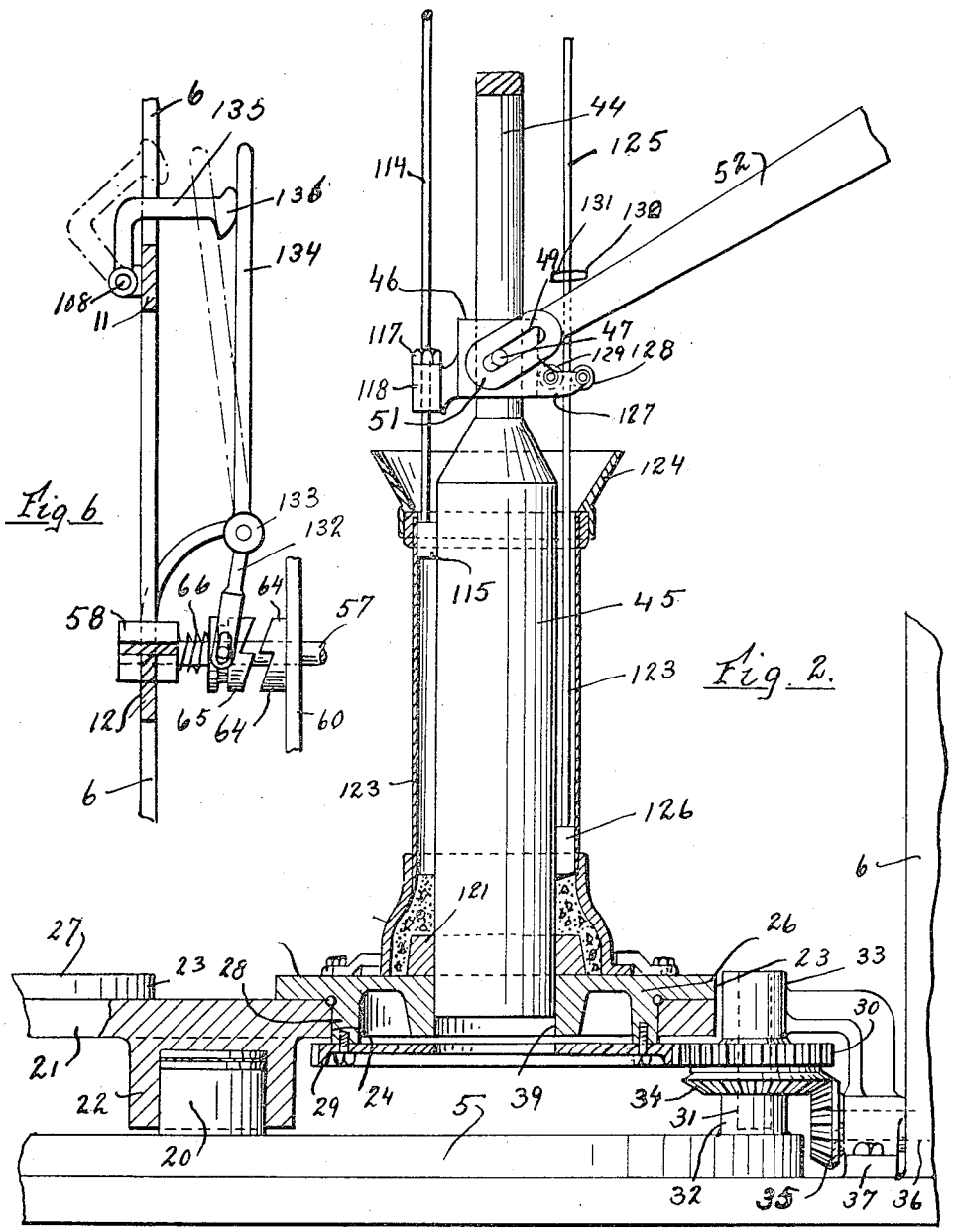

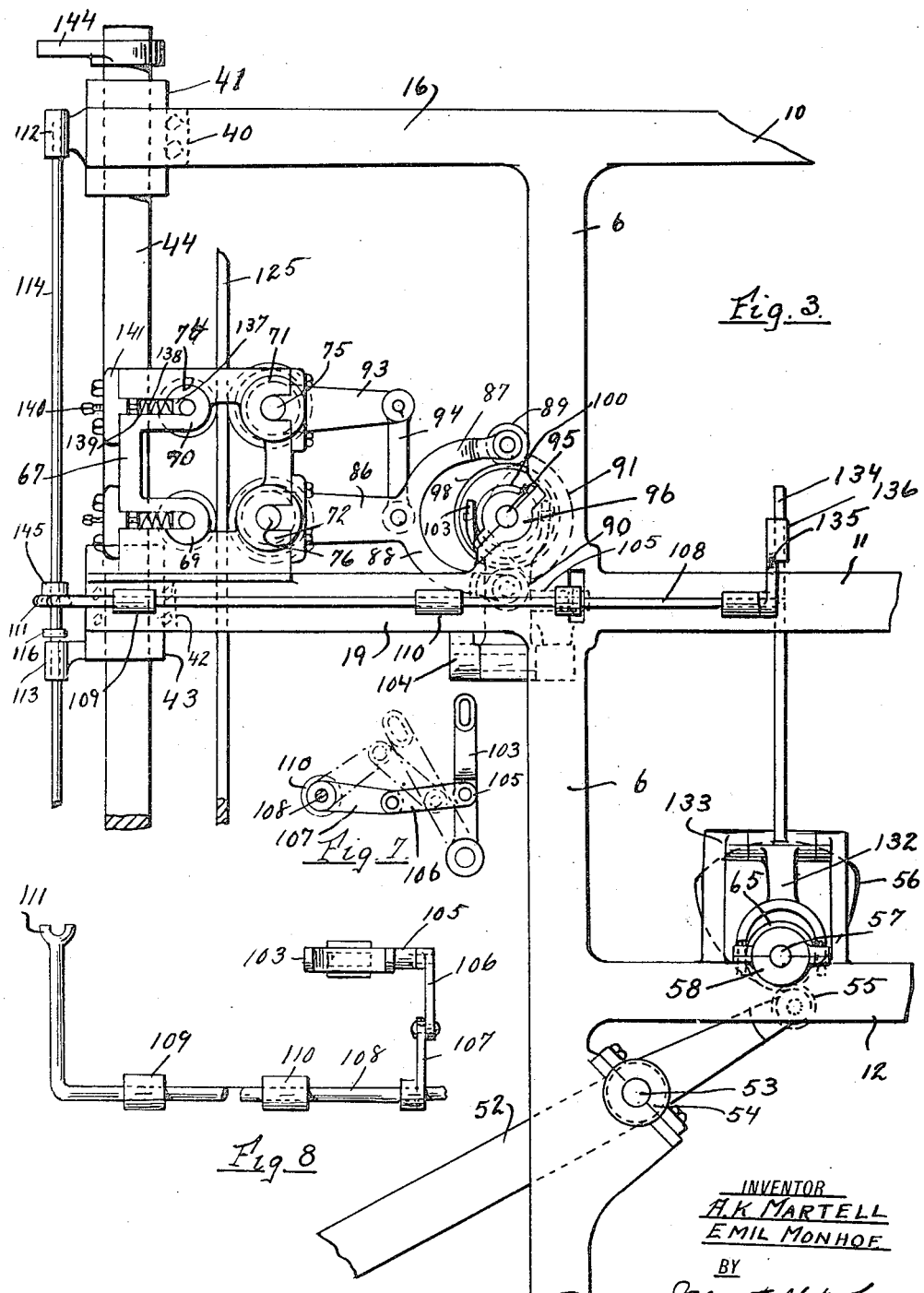

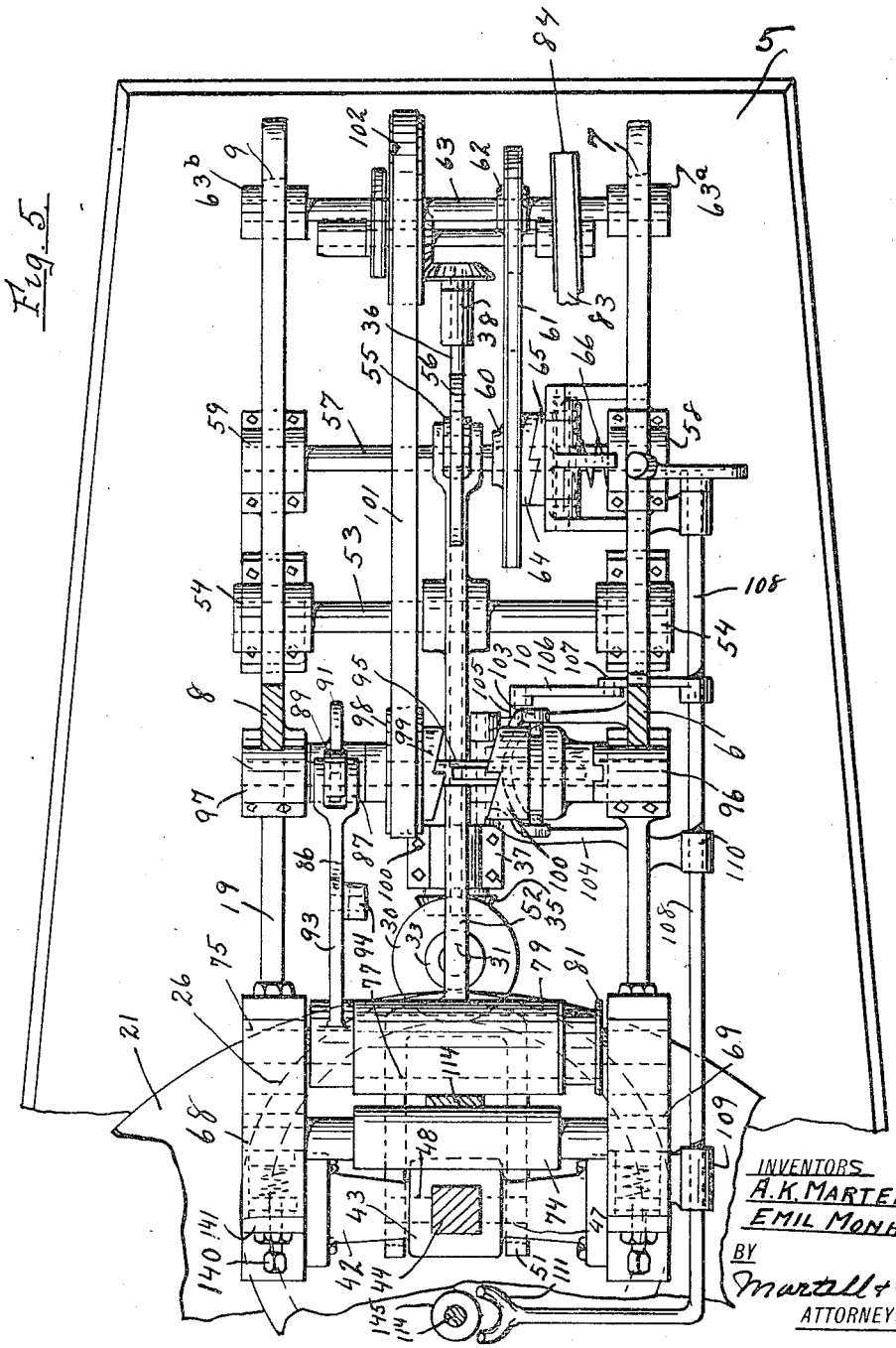

ANDREW K. MARTELL AND EMIL MONHOF, OF LOS ANGELES, CALIFORNIA.

PIPE-MAKING MACHINE.

1,288,637.　　　　　　Specification of Letters Patent.　　Patented Dec. 24, 1918.

Application filed August 5, 1918.　Serial No. 248,315.

*To all whom it may concern:*

Be it known that we, ANDREW K. MARTELL and EMIL MONHOF, citizens of the United States, and residents of Los Angeles, in the county of Los Angeles, State of California, have invented certain new and useful Improvements in Pipe-Making Machines, of which the following is a specification.

Our invention relates primarily to a machine for making pipe such as water, sewer and irrigating pipe from concrete and the like plastic material and the object thereof is to provide a machine for that purpose which will be simple in construction and efficient in operation and in which the pipe manufactured thereby will be of a maximum density and able to resist high pressures without fracturing.

A further object is to provide a machine in which the density of the pipe made thereby will be automatically maintained uniform and in which the density of the pipe can be easily and quickly regulated to suit varying conditions.

A still further object is to provide a machine for making pipe from plastic material in which the speed with which the pipe is formed is regulated by the density desired and the speed with which the material is fed thereto.

Other objects and advantages will appear hereinafter and while we have shown and will describe our preferred form of construction we wish it understood that we do not limit ourselves to such preferred form but that various changes and adaptations may be made therein without departing from the spirit of our invention.

We accomplish the above objects by the mechanism described herein and illustrated in the accompanying drawings forming a part hereof in which:

Figure 1 is a side elevation of our machine ready for use.

Fig. 2 is an enlarged side elevation of the lower portion of our machine with parts broken away.

Fig. 3 is an enlarged side elevation of the upper portion of our machine with parts broken away.

Fig. 4 is an enlarged detail of the tamper mechanism and its complement parts.

Fig. 5 is a top plan of the parts shown in Fig. 1 enlarged.

Fig. 6 is a detail view of the elevating clutch control.

Figs. 7 and 8 are enlarged detail views of the tamper clutch control.

Referring to the drawings our machine comprises a base or foundation plate 5 mounted upon a suitable foundation in the ground but not shown. Extending upwardly from each side of the rear of plate 5 are legs or standards 6, 7, 8, and 9, members 6 and 7 being tied together at their upper ends by cross bars 10, and intermediate their ends by cross bars 11 and 12, and members 8 and 9 being similarly tied together by similar cross bars. Extending forwardly from member 6 in alinement with cross bars 10 and 11 are supporting members 16 and 17, and similar supporting members extend from standard 8. Extending upwardly from the center of the front end of base plate 5 is a king bolt 20 upon which is revolubly mounted a turn-table 21 by means of a socket 22, suitable anti friction devices being provided to eliminate friction. Intermediate socket 22 and its outer periphery table 21 is provided with circular apertures 24 and 25 of which we have shown two, as being oppositely disposed each to the other, but more or less may be used as desired. Revolubly mounted in apertures 24 and 25 are the mold carrying members 26 and 27 each provided with an annular flange 23, resting upon the top of table 21 as best shown in Fig. 2. Members 26 and 27 are each provided with a downwardly depending annular rim 28, the circumference of which is of a diameter to rotate freely within said apertures. A ring gear 29 is detachably mounted upon the lower edge of rim 28, concentric therewith, and normally meshes with the teeth of driving gear 30.

Gear 30 is rigidly mounted upon vertical shaft 31 revolubly mounted at its ends in bearings 32 and 33 extending upwardly from base plate 5. Rigidly mounted upon shaft 31 immediately below gear 30 is a bevel gear 34 which meshes with a similar gear 35 mounted upon the end of operating shaft 36. Shaft 36 is revolubly mounted in bearings 37 and 38 mounted upon the base plate 5.

Members 26 and 27 are provided centrally with a concentric aperture 39 for a purpose hereafter explained. Secured at its ends to supporting members 16 and 18 is a cross head 40 provided centrally of its length with a vertical bearing 41, and a similar cross head 42 is secured to members 17 and 19 and carries a vertical bearing 43. Slidably mounted in bearings 41 and 43 is a core carrying shaft 44, upon the lower end of which is rigidly mounted the core 45. Core 54 is preferably formed cylindrical in shape and has its upper end tapering inwardly for a purpose hereafter explained.

Rigidly secured upon shaft 44 immediately above core 45 is a bracket 46, provided with outwardly projecting pins 47 and 48 which pins project normally loosely into the slots 49 of the forked end 51 of the elevating arms 52. Arm 52 is pivotally mounted intermediate its ends upon a shaft 53 mounted at its ends in bearings 54 secured upon standards 6 and 8. The free end of arm 52 is bifurcated and carries a roller 55 which roller is adapted to bear against the periphery of elevating cam 56. Cam 56 is rigidly mounted upon a shaft 57 mounted at its ends in bearings 58 and 59 secured upon cross bars 12 and 15. A sprocket wheel 60 is loosely mounted upon shaft 57 and is connected by a chain 61 to a sprocket wheel 62 rigidly mounted upon a shaft 63.

Extending outwardly from one side of sprocket 60 concentric therewith is one of the members 64 of a jaw clutch, and the other member 65 of said clutch is slidably but non-revolubly mounted on said shaft whereby said members may be brought into engagement to lock sprocket 60 to said shaft 57 and vice versa. A coil spring 66 surrounds shaft 57 between member 65 and bearing 58 and normally acts to hold the clutch members in engagement. Mounted upon the upper faces of supporting members 17 and 19 are upwardly extending brackets 67 and 68 in which are provided bearings 69, 70, 71 and 72. Revolubly mounted at their ends in bearings 69 and 70 are bearing rollers 73 and 74, and revolubly mounted at their ends in bearings 71 and 72 are driving roller axles 75 and 76. The central portions 77 and 78 of axles 75 and 76 are eccentric to and of larger diameter than the ends and on these eccentric portions are revolubly mounted the tamper operating rollers 79 and 80, so that when axles 75 and 76 are oscillated rollers 79 and 80 will be moved nearer to or farther from bearing rollers 73 and 74.

Driving pulleys 81 and 82 are secured to the ends of rollers 79 and 80 concentric therewith and a driving belt 83 connects said pulleys to a pulley 84 mounted on shaft 63, said belt passing around the front of pulley 81, then around the back of pulley 82, and then around idler pulley 85 and thence to pulley 84 on shaft 63, thereby causing rollers 79 and 80 to rotate in opposite directions. Rigidly mounted on one end of axle 75 is one end of a vibrating member 86, the other end of which extends rearwardly and is substantially Y-shaped in side elevation. Revolubly mounted in the ends of the legs 87 and 88 of member 86 are rolls 89 and 90 adapted to bear against the periphery of a vibrating cam 91.

Rigidly mounted on one end of axle 76 is one end of a vibrating arm 93, the free end of which is connected by a link 94 to member 86 whereby said axles are caused to vibrate synchronously.

Cam 91 is rigidly mounted upon a shaft 95 revolubly mounted at its ends in bearings 96 and 97 on supporting members 17 and 19 respectively. Loosely mounted on shaft 95 is an operating pulley 98 to one side of which is secured one of the members 99 of a jaw clutch, the other member 100 of which jaw clutch is slidably but non-revolubly mounted on said shaft 95 and is adapted to be brought into engagement with the other member 99 to lock pulley 98 to said shaft. Pulley 98 is connected by a belt 101 to a pulley 102 on countershaft 63 whereby rotative movement is imparted to shaft 95. Clutch member 100 is controlled by a yoke 103, pivotally mounted in a bearing 104 secured to supporting member 19. Yoke 103 is provided intermediate its ends with an outwardly extending ear or boss 105 in which is pivotally mounted one end of a link 106. The other end of link 106 is pivotally connected to the free end of an operating lever 107, the other end of which lever is rigidly secured upon a control shaft 108. It will be understood that the relative proportions and positions of said link and lever and coöperative parts is such that when clutch members 99 and 100 are in engagement the pivotal connection between said link and lever is slightly below the centers of the other ends thereby preventing the accidental movement of said yoke. Shaft 108 is revolubly mounted in bearings 109 and 110 secured upon the outer side of members 17 and has its front end bent at a right angle to extend in front of cross head 42 to near the vertical center thereof where it terminates in a forked end 111. Slidably mounted in bearings 112 and 113, extending forwardly from bearings 42 and 43 is a trip rod 114 upon the lower end of which is mounted a rider member 115.

Rider 115 is designed to rest upon the top edge of the pipe during the formation of the upper portion thereof and be carried up thereby. Adjustably secured upon rod 114 just above bearing 113 is a collar 116 adapted when rod 114 is moved upwardly by the increasing height of the pipe, through rider 115, to engage forked end 111 of shaft 108 and elevate the same thereby rocking the shaft 108 and releasing the vibrating cam clutch and engaging the elevating cam clutch. An adjusting collar 117 on rod 114, just above bearing 118 projecting forwardly from bracket 46 serves to retard the downward movement of rod 114 beyond its predetermined position. Securely mounted upon mold carrying members 26 and 27 to surround openings 39 are auxiliary cores 121 adapted to shape the lower end of the pipe, it being understood that while we have shown our machine as being adapted for what is known as "bell and spigot" or bell end pipe, any of the well known forms of pipe may be made by substituting the desired auxiliary cores for the cores 121. Detachably mounted upon members 26 and 27 concentric with cores 121 are the hollow cylindrical molds 123 on the upper end of which is mounted a hopper 124. A tamper carrier 125 extends vertically between rollers 73 and 75 and 74 and 76 and has mounted upon its lower end a tamper 126 the lower or contact face of which is tapered slightly downward and inward for a purpose hereafter explained. Extending rearwardly from bracket 46 is a bifurcated member 127 in which are revolubly mounted guide rollers 128 and 129, one on each side of tamper carrier 125, and extending from carrier 125 at right angles to rolls 128 and 129 are studs 130 and 131 adapted to be engaged by said rollers when shaft 44 is moved upwardly with the core and elevates the tamper carrier and tamper therewith. Clutch member 65 is controlled by a yoke 132 mounted in a bearing 133 secured to cross-bar 12, and extending upwardly from said yoke is an operating lever 134. Rigidly mounted upon the end of shaft 108 is a bell crank lever 135 terminating in a head 136, which head is adapted to engage the upper end of lever 134 to hold clutch member 65 out of engagement with member 64 against the force of spring 66. Bearings 69 and 70 are slotted as best shown in Fig. 4, and a shoe 137 is slidably mounted therein and bears against the axles of bearing rollers 73 and 74, and a coil spring 138 has one end bearing against said shoe and its other end bearing against adjusting plate 139. An adjusting screw 140 passes through cap 141 of said bearings in threaded engagement therewith and provides means for regulating the pressure of said spring on the roller axles.

In the operation of our machine:

With the parts in the positions shown the machine is at the commencement of its operation. The vibrating clutch is in engagement and elevating clutch is disengaged. The vibrating rollers are being revolved rapidly in opposite directions by means of belt 83.

As cam 91 is rotated vibrating member 86 and arm 93 are caused to rock or vibrate thereby causing rollers 79 and 80 to alternately contact with tamper carrier 125 thereby imparting to the same an up and down movement, it being understood that the rollers 79 and 80 will be so proportioned as to size and speed that the down movement as to speed and duration, will be faster and shorter respectively than the up movement, the object being to drive or shoot the tamper downwardly at great speed to obtain the desired amount of force in tamping the material and owing to the constantly increasing height of the material within the mold as the pipe is formed the tamper carrier is released before it contacts with the material its speed carrying it the balance of its travel. By this arrangement the force or pressure necessary to obtain various degrees of density can be easily and quickly regulated. Material is fed into the hopper in any desired manner. Mold carrying member 26 is being rotated by means of gears 29 and 30 and bevel gears 34 and 35, thereby rotating mold 123 core 45 being non-rotating. As the material enters the hopper it travels into the mold and rests upon the material previously formed therein. As the mold rotates the material is carried around beneath the tamper where it is compacted. As the material nears the top of the mold rider 115 begins to rise and elevate rod 114 until collar 116 engages and elevates fork 111 and rocks shaft 108 thereby releasing clutch member 100 from engagement with member 99 and stopping the rotation of the vibrator cam and with it the tamper. As shaft 108 is rocked bell crank lever 135 is moved away from contact with lever 134 which permits spring 66 to force member 65 into engagement with member 64 and cam 56 will rotate and through arm 53 elevate core 45 and shaft 44 to withdraw the core from the interior of the pipe just formed. Lever 142, mounted upon the edge of turn table 21 is then released from catch 143 in foundation plate 5 and turntable 21 is rotated to bring a new empty mold in place of the one just filled.

The core then descends to its normal position, it being understood that cam 56 continues to rotate while the turn table is being rotated and that a dwell is provided in said cam to hold said core and shaft elevated while said table is rotated. As the core shaft moves downwardly push plate 144 mounted upon the upper end of shaft 44, will engage and depress rod 114 at its upper end and by means of collar 145 on said rod depress fork 111 and rotate shaft 108 and coöperative parts to their normal positions. A tongue 148 in the outer end of clutch member 100 is adapted to enter groove 149 in the adjacent end of bearing when said clutch member is drawn out of engagement and is so positioned as to hold the driving rollers in a neutral position. By rotating the mold while the core is held stationary we are enabled to impart a highly polished and very smooth interior to our pipe.

Having described our invention what we claim is:

1. In a pipe making machine having a rotating mold and a non-rotating core, means for compacting the material as it is fed into the mold comprising a vertically movable tamper adapted to be positioned within said mold between its inner wall and the core; means to cause said tamper to vibrate vertically and to rise relative to the vertical height of said mold as the material is fed thereinto and compacted, synchronously with the increasing height of the pipe being formed.

2. In a pipe making machine a frame; a base for said frame; a rotatable table mounted on said base to rotate horizontally; a plurality of rotatable tables mounted on said first table arranged to carry molds; means to rotate said last tables; a vertically movable core mounted in said frame adapted to be positioned within said molds; a vibrating tamper mounted in said frame adapted to be positioned within said molds coincident with said core between the inner wall of the mold and the core; means to cause said tamper to vibrate; means to move said core vertically at predetermined times; and means to release said tamper operating means and set in operation said core elevating means.

3. In a pipe making machine a frame; a base for said frame; a rotatable table mounted on said base to rotate horizontally; a plurality of rotatable tables mounted on said first table arranged to carry molds; means to rotate said last tables; a vertically movable core mounted in said frame adapted to be positioned within said molds; a vibrating tamper mounted in said frame adapted to be positioned within said molds coincident with said core; means to operate said tamper; means to move said core vertically; means to release said tamper operating means and set in motion said core elevating means; and means controlled by the pipe being formed to set in operation said releasing means.

4. In a pipe making machine having a non-rotating core and a rotating mold, means for compacting the material as it is fed into the mold comprising a vertically movable tamper, a pair of rotatable rollers between which said tamper passes; means to rotate said rollers in opposite directions; and means to cause first one and then the other of said rollers to contact with said tamper whereby said tamper is caused to vibrate.

5. In a pipe making machine a tamper; a pair of rotatable rollers between which said tamper passes; means to rotate said rollers in opposite directions; means to cause first one and then the other of said rollers to engage said tamper and operate the same; and means to render said last means inoperative.

6. In a pipe making machine a frame; a rotatable table mounted in said frame to rotate horizontally; a plurality of tables mounted on said first table arranged to carry molds; means to rotate said last tables; a vertically movable core mounted in said frame adapted to be positioned within said molds; a tamper mounted in said frame adapted to be driven alternately up and down, the relative amount of travel being always the same but the drive upward being greater than the drive downward, said tamper being driven for a portion of its down movement only; means to operate said tamper; means to release said operating means; means to move said core vertically at predetermined times; means to set in motion said core moving means; and means controlled by the pipe being formed to set in motion said releasing means.

7. In a pipe making machine having a non-rotating core and a rotating mold, means for compacting material fed into said mold comprising a vertically movable tamper; a pair of oppositely revolving rollers adapted to be brought into contact with said tamper, one at a time, to operate the same; means to rotate said rollers; and means to cause said rollers to contact with said tamper at predetermined times.

8. In a machine for forming pipe from plastic material having a rotating mold and a non-rotating core, means for compacting plastic material fed into said mold, said means comprising a tamper mounted to project into said mold between the same and the core, means to drive said tamper in alternate up and down movements, said tamper being driven during its entire up movement and for a portion only of its down movement and being caused by its momentum to impact upon the plastic material within the mold and compact the same.

9. In a machine for forming pipe from plastic material having a mold, and a core within said mold, means to compact material fed into said mold, comprising a tamper adapted to project into said mold and to move vertically; means to cause said tamper to move in alternate up and down movements comprising a pair of rollers mounted to rotate in opposite directions adapted to be brought into alternate contact with said tamper to move the same in opposite directions; means to cause said rollers to contact with said tamper; and means to render said last means inoperative.

10. In a machine for forming pipe from plastic material having a rotating mold and a non-rotating core, means for compacting the material as it is fed into said mold, said means comprising a vertically movable tamper mounted to project into said mold, driving means for said tamper adapted to cause the same to reciprocate vertically, said tamper being driven during its entire up movement and for a portion only of its downward movement and being caused by its momentum to impact upon said plastic material and compact the same, whereby said tamper is permitted to rise with the increasing height of the pipe being formed.

11. In a machine for forming pipe from plastic material having a rotating mold and a non-rotating core; means to supply plastic material into said mold; and means to tamp said plastic material as it is fed into said mold comprising a vertically reciprocating tamper, said tamper being positively driven for its entire upward movement and for a portion only of its downward movement and being carried by the momentum imparted during the positively driven portion of its down movement into contact with the plastic material, whereby the same is compacted, the amount of compacting being governed solely by the speed with which said tamper is driven downwardly, and means operated by the increasing height of the pipe being formed to render said last means inoperative.

12. In a machine for forming pipe from plastic material having a stationary core and a rotating mold, means to tamp plastic material fed into said mold comprising a tamper mounted to reciprocate vertically, said tamper being positively driven during its entire up movement and for a portion only of its down movement and being caused by the momentum gathered during the positively driven portion of its down movement to impact upon the plastic material and compact the same, the amount of up movement being always the same but the amount of down movement being controlled by the plastic material fed into the mold whereby said tamper is gradually moved upwardly synchronously with the increasing height of the pipe being made.

In witness that we claim the foregoing we have hereunto subscribed our names this 29th day of July 1918.

ANDREW K. MARTELL.
EMIL MONHOF.

Copies of this patent may be obtained for five cents each, by addressing the "Commissioner of Patents, Washington, D. C."